US008744123B2

(12) United States Patent
Bobbitt et al.

(10) Patent No.: US 8,744,123 B2
(45) Date of Patent: Jun. 3, 2014

(54) MODELING OF TEMPORARILY STATIC OBJECTS IN SURVEILLANCE VIDEO DATA

(75) Inventors: Russell P. Bobbitt, Pleasantville, NY (US); Quanfu Fan, Somerville, MA (US); Zuoxuan Lu, Yorktown Heights, NY (US); Jiyan Pan, Pittsburgh, PA (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 13/220,213

(22) Filed: Aug. 29, 2011

(65) Prior Publication Data

US 2013/0051613 A1    Feb. 28, 2013

(51) Int. Cl.
*G06K 9/00*    (2006.01)
(52) U.S. Cl.
USPC ............................................. 382/103; 382/224
(58) Field of Classification Search
None
See application file for complete search history.

(56) References Cited

U.S. PATENT DOCUMENTS

| | | | |
|---|---|---|---|
| 7,620,266 B2 | 11/2009 | Brown et al. | |
| 7,813,528 B2 | 10/2010 | Porikli et al. | |
| 8,145,007 B2 * | 3/2012 | Davey et al. | 382/274 |
| 2005/0036658 A1 | 2/2005 | Gibbins et al. | |
| 2005/0073585 A1 | 4/2005 | Ettinger et al. | |
| 2006/0015603 A1 | 1/2006 | Jakobson et al. | |
| 2006/0253816 A1 | 11/2006 | Gould et al. | |
| 2007/0058040 A1 | 3/2007 | Zhang et al. | |
| 2007/0279490 A1 | 12/2007 | Zhou et al. | |
| 2009/0238462 A1 | 9/2009 | Feris et al. | |
| 2010/0322475 A1 | 12/2010 | Ikeda | |
| 2012/0162416 A1 * | 6/2012 | Su et al. | 348/143 |

FOREIGN PATENT DOCUMENTS

WO    WO2004045215 A1    5/2004

OTHER PUBLICATIONS

Bayona et al. (Sep. 2009) "Comparative evaluation of stationary foreground object detection algorithms based on background subtraction techniques." Proc. 2009 IEEE CS Conf. on Advanced Video and Signal Based Surveillance, pp. 25-30.*
Beynon et al. (Jul. 2003) "Detecting abandoned packages in a multi-camera video surveillance system." Proc. 2003 IEEE Conf. on Advanced Video and Signal Based Surveillance, pp. 221-228.*
Bhargava et al. (Jan. 2009) "Detection of object abandonment using temporal logic." Machine Vision and Applications, vol. 20 pp. 271-281.*

(Continued)

*Primary Examiner* — Barry Drennan
(74) *Attorney, Agent, or Firm* — Patrick J. Daugherty; Driggs, Hogg, Daugherty & Del Zoppo Co., LPA (57) ABSTRACT

A foreground object blob having a bounding box detected in frame image data is classified by a finite state machine as a background, moving foreground, or temporally static object, namely as the temporally static object when the detected bounding box is distinguished from a background model of a scene image of the video data input and remains static in the scene image for a threshold period. The bounding box is tracked through matching masks in subsequent frame data of the video data input, and the object sub-classified within a visible sub-state, an occluded sub-state, or another sub-state that is not visible and not occluded as a function of a static value ratio. The ratio is a number of pixels determined to be static by tracking in a foreground region of the background model corresponding to the tracked object bounding box over a total number of pixels of the foreground region.

20 Claims, 3 Drawing Sheets

(56) References Cited

OTHER PUBLICATIONS

Fan et al. (Jun. 2009) "Recognition of repetitive sequential human activity." Proc. 2009 IEEE Conf. on Computer Vision and Pattern Recognition, pp. 943-950.*

Fan et al. (Sep. 2011) "Modeling of temporarily static objects for robust abandoned object detection in urban surveillance." Proc. 2011 IEEE Int'l Conf. on Advanced Video and Signal-Based Surveillance, pp. 36-41.*

Guler et al. (Sep. 2007) "Stationary objects in multiple object tracking." Proc. 2007 IEEE Conf. on Advanced Video and Signal-Based Surveillance, pp. 248-253.*

Ferryman, J.M., Ed. (Jun. 2006). Proceedings, $9^{th}$ IEEE International Workshop on Performance Evaluation of Tracking and Surveillance.*

Singh et al. (Sep. 2009) "An abandoned object detection system based on dual background segmentation." Proc. 2009 IEEE Int'l Conf. on Advanced Video and Signal-Based Surveillance, pp. 352-357.*

Spengler et al. (2003) "Automatic detection and tracking of abandoned objects." Proc. IEEE Int'l Workshop on Visual Surveillance and Performance Evaluation of Tracking and Surveillance.*

Stauffer et al. (Jun. 1999) "Adaptive background mixture models for real-time tracking." Proc. 1999 IEEE CS Conf. on Computer Vision and Pattern Recognition, pp. 246-252.*

Thul, E. (Mar. 2007) Adaptive Background Mixture Models for Real-Time Tracking.*

Wen et al. (Nov. 2009) "Generative model for abandoned object detection." Proc. 2009 IEEE Int'l Conf. on Image Processing, pp. 853-856.*

Evangelio et al, A System for Automatic and Interactive Detection of Static Objects, IEEE, Oct. 2010, pp. 27-32.

Ayesha Choudhary et al, Unusual Activity Analysis in Video Sequences, Springer-Verlag Berlin Heidelberg, 2007, pp. 443-450.

Horng-Horng Lin et al, Regularized Background Adaptation: A Novel Learning Rate Control Scheme for Gaussian Mixture Modeling, IEEE Transactions on Image Processing, vol. 20, No. 3, 2011, pp. 822-836.

Fatih Porikli et al, Robust Abandoned Object Detection Using Dual Foregrounds, EURASIP Journal on Advances in Signal Processing, 2008, 12 pp.

Huei-Hung Liao et al, A Localized Approach to Abandoned Luggage Detection with Foreground-Mask Sampling, IEEE Fifth International Conference on Advanced Video and Signal Based Surveillance, 2008, pp. 132-139.

Ying-Li Tian et al, Real-Time Detection of Abandoned and Removed Objects in Complex Environments, IEEE International Workshop on Visual Surveillance, Sep. 2008, 8 pp.

Ying-Li Tian et al, Robust and Efficient Foreground Analysis for Real-time Video Surveillance, CVPR, Jan. 20, 2005, 6 pp.

* cited by examiner

PRIOR ART

MODELING OF TEMPORARILY STATIC OBJECTS IN SURVEILLANCE VIDEO DATA

BACKGROUND

The present invention relates to the analysis of activities in videos, and more particularly to accurately determining and distinguishing object movements and activities represented thereby.

Video surveillance enables object monitoring through video displays of one or more areas remote from a human monitor. Exemplary applications include security surveillance of public and private areas, for example parking lots for human and vehicle movements, assembly areas such as train stations and entertainment halls for abandoned baggage or objects, borders and doorways for unauthorized entry, secured areas for unauthorized vehicle or object movements and removals, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective. Accordingly, it is often desirable to implement automated systems for video analysis.

Automated analysis of videos for determining object movements, activities and behaviors in video surveillance system data is known, wherein computers or other programmable devices directly analyze video data and attempt to determine the occurrence of activities of concern, for example to detect and distinguish abandoned objects within a scene such as packages and parked cars. However, determining and differentiating humans and objects or their movements within a video stream is often not reliable in realistic, real-world environments and applications, sometimes due to clutter, poor or variable lighting and object resolutions and distracting competing visual information.

BRIEF SUMMARY

In one embodiment of the present invention, a method for using region-level adaptive background modeling includes classifying via a finite state machine device an object blob having a bounding box detected in frame image data of a video data input as a background, moving foreground, or temporally static object, through classifying as the temporally static object when the detected bounding box is distinguished from a background model of a scene image of the video data input and remains static in the scene image for at least a first threshold period. Thus, the bounding box of the temporally static object is tracked by the finite state machine device through matching masks of the bounding box in subsequent frame data of the video data input, and the object sub-classified within a visible sub-state, an occluded sub-state, or another sub-state that is not visible and not occluded as a function of a static value ratio. The ratio is a number of pixels determined to be static by tracking by the finite state machine device in a foreground region of the background model corresponding to the tracked object bounding box over a total number of pixels of the foreground region.

In another embodiment, a method for providing a service for using region-level adaptive background modeling includes providing a finite state machine that classifies an object blob having a bounding box detected in frame image data of a video data input as a background, moving foreground, or temporally static object, through classifying as the temporally static object when the detected bounding box is distinguished from a background model of a scene image of the video data input and remains static in the scene image for at least a first threshold period. Thus, the bounding box of the temporally static object is tracked by the finite state machine device through matching masks of the bounding box in subsequent frame data of the video data input, and the object sub-classified within a visible sub-state, an occluded sub-state, or another sub-state that is not visible and not occluded as a function of a static value ratio. The ratio is a number of pixels determined to be static by tracking by the finite state machine device in a foreground region of the background model corresponding to the tracked object bounding box over a total number of pixels of the foreground region.

In another embodiment, a system has a processing unit, computer readable memory and a computer readable storage medium device with program instructions, wherein the processing unit, when executing the stored program instructions, classifies an object blob having a bounding box detected in frame image data of a video data input as a background, moving foreground, or temporally static object, through classifying as the temporally static object when the detected bounding box is distinguished from a background model of a scene image of the video data input and remains static in the scene image for at least a first threshold period. Thus, the bounding box of the temporally static object is tracked through matching masks of the bounding box in subsequent frame data of the video data input, and the object sub-classified within a visible sub-state, an occluded sub-state, or another sub-state that is not visible and not occluded as a function of a static value ratio. The ratio is a number of pixels determined to be static by tracking in a foreground region of the background model corresponding to the tracked object bounding box over a total number of pixels of the foreground region.

In another embodiment, an article of manufacture has a computer readable storage medium device with computer readable program code embodied therewith, the computer readable program code comprising instructions that, when executed by a computer processor, cause the computer processor to classify an object blob having a bounding box detected in frame image data of a video data input as a background, moving foreground, or temporally static object, through classifying as the temporally static object when the detected bounding box is distinguished from a background model of a scene image of the video data input and remains static in the scene image for at least a first threshold period. Thus, the bounding box of the temporally static object is tracked through matching masks of the bounding box in subsequent frame data of the video data input, and the object sub-classified within a visible sub-state, an occluded sub-state, or another sub-state that is not visible and not occluded as a function of a static value ratio. The ratio is a number of pixels determined to be static by tracking in a foreground region of the background model corresponding to the tracked object bounding box over a total number of pixels of the foreground region.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Automated video surveillance systems may be utilized in the detection of bags or luggage "dropped" or left unattended, either intentionally or unintentionally in public places of assembly such as airports, sometimes referred to as "Abandoned Object Detection" (AOD). Successful AOD implementations must overcome a number of technical challenges, such as lighting changes, occlusions and cluttered backgrounds typical in image scenarios. In addition, since true intentional drops may be relatively rare, AOD systems should have careful control of false alarms in order to make effective adjudication of the system possible.

An object of successful AOD implementation is to detect objects that remain static in a scene. However, many movable or moving objects are often observed staying static (such as cars stopping at red light) or near static (still pedestrians on the street) in a scene for a short time period. How to separate them from suspicious drops is a key issue to address in reducing false alarms. Object detectors may be implemented for detecting and distinguishing certain object from other, for example person or car detectors: such detectors may help to some degree, but cannot generally provide consistent robust object recognition in complex realistic scenarios.

Figure 1:
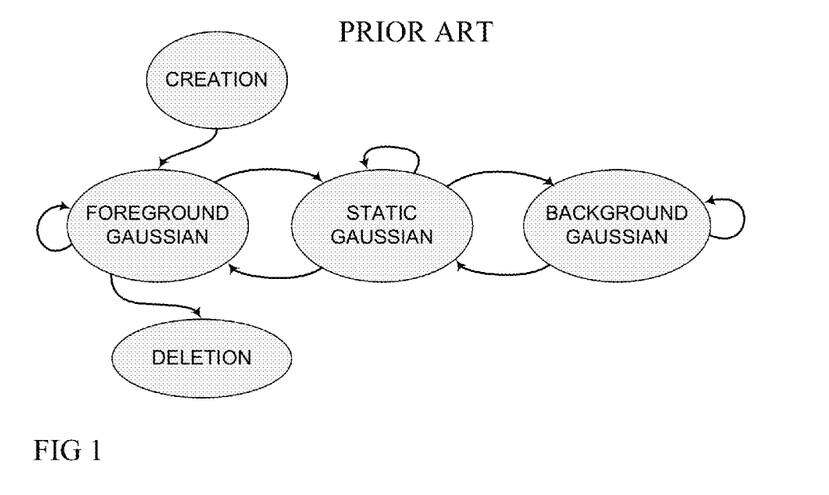
FIG. 1 is a state diagram illustration of a prior art Gaussian Mixture Model (GMM) for background.

Prior art AOD techniques are generally based on background modeling subtraction (BGS) to detect static objects. For example, FIG. 1 illustrates one prior art method utilizing a background segmentation stage with a Gaussian Mixture Model (GMM), followed by a blob tracking analysis stage. Here object tracking analysis is based on finding the correspondence between the blobs identified in two consecutive frames, with certain rules (for example, color, shape, distance or object size) used in this module to perform the tracking analysis. However, if not properly handled, temporarily static objects pose adverse effects on such background modeling. The Gaussian mixtures modeling illustrated will gradually adapt standing or sitting people or other moving objects that are temporarily static into the background, thereby contaminating the background. As a result, such techniques may likely confuse temporarily still people with static objects that are actually the subject of suspicious drop determinations, thereby yielding a low precision in complex scenes or those with high activity. Moreover, once contaminated the background won't be able to be recovered quickly after the people leave, as the modeling generally utilizes pixel-level information to update the background through a slow learning rate that requires many subsequent frame image iterations in time to clean up the background to eventually remove the object. Accordingly, any immediate true abandoned item drops in the image areas previously occupied by temporarily static objects (for example, people standing or sitting in previous frames who have subsequently moved) may escape from being detected due to the contamination from the since-departed temporarily static object.

Figure 2:
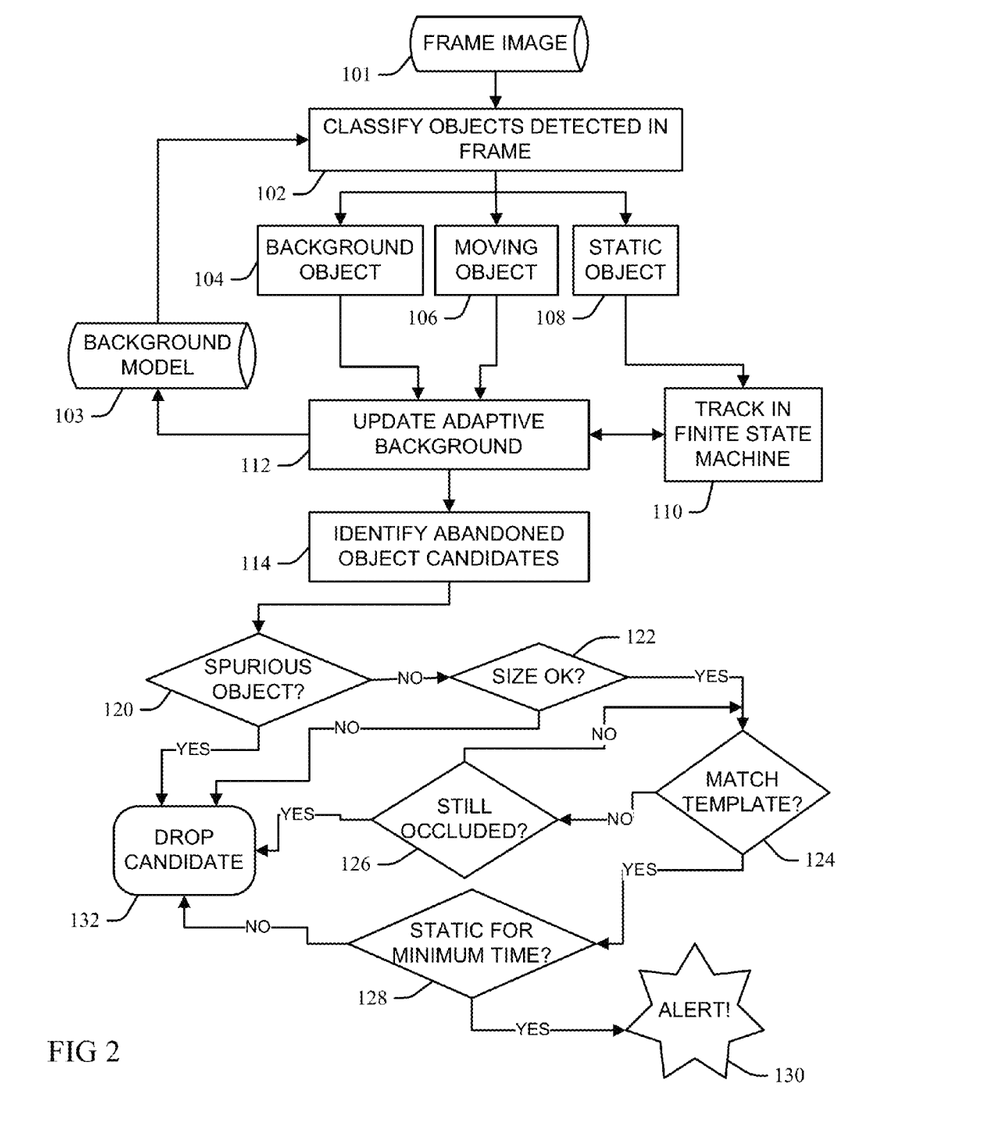
FIG. 2 is a block diagram illustration of a method or system according to the present invention for using adaptive background modeling to track objects.

FIG. 2 illustrates an embodiment of a method, process or system according to the present invention for using adaptive background modeling to track objects. At 102 foreground object blobs in a frame image input 101 are distinguished from a BGS background model 103 of a scene image and classified as background objects 104, moving foreground objects 106 or static objects 108. More particularly, objects identified at 102 as having bounding boxes detected in image data that are distinguished from the background model and that stay static (remain unchanged) in the scene image for at least a first threshold period are classified as temporally static objects (TSO's) 108 and tracked in subsequent frame data of the video data input by a finite state machine (FSM) at 110. In some examples, the static object first threshold period is one second, though other values may be practiced.

Masks of all TSO's currently being tracked are matched at 110 by the FSM with foreground objects in the background model 103 and classified with respect to the matching results within either a first "static object (SO)" stage or as a second "healed object (HO)" stage, and further into one of three sub-states of the two stages: as "visible" with respect to (in contrast to) the background model 103; as "occluded", wherein the image of a tracked TSO is partially occluded by one or more foreground objects; or as "held," a special temporary holding state designated prior to terminating the tracking of the temporarily static objects by the FSM. Tracked TSO's are thus classified by the FSM at 110 as "visible healed objects" and identified as possible (hypothetic) abandoned objects at 114; dropped from tracking if classified as a moving object; or they may be permanently pushed into the background if staying static too long in the scene. At 112 the BGS model 101 is accordingly updated or otherwise adapted in response to the TSO classifications at 110 in a feedback loop: moving background objects 104 into the background, and excluding moving objects 106 and static, non-background objects 108 from the background. Generally, the background model 103 used for each subsequent frame is updated at 112 in response to the classifications performed at 110 for each video data frame of input video, though other update epochs may be practiced.

Embodiments of the present invention may further validate the "visible healed objects" identified as hypothetic abandoned objects at 114 prior to issuing any static object determination alerts, in one aspect to reduce false alarms. Thus, in the present embodiment, a foreground (or "foregroundness") validation component determines whether any of the hypothetic static objects are instead "ghosts" or other spurious pixel data items at 120. More particularly, in complex environments involving crowds and pluralities of occlusions, background model processes may create backgrounds comprising spurious "ghost," which static regions that are left behind by static objects after they leave. Other spurious items include sunspots, shadows or other image anomalies that may be created within a scene or a camera lens through lighting glare, reflections, changing lighting conditions, etc., wherein they may be interpreted within image data as objects. To filter such false positives, embodiments may validate the foregrounds by exploiting context information surrounding the static region of the candidate object to identify the hypothetic objects as abandoned objects, for example using "region growing" processes and systems taught by "Real-time detection of abandoned and removed objects in complex environments" by Y. L. Tian, R. S. Feris, and A. Hampapur, IEEE International Workshop on Visual Surveillance, 2008. Such region growing methods generally explore the similarities between the static region and its surroundings, both in the frame and background images to classify the type of a hypothetic object as either an abandoned object candidate or as a "ghost" or other spurious object information to be dropped from the FSM (and thus from further consideration as an abandoned object candidate) at 132.

At 122 the present embodiments also apply a size template to any remaining hypothetic abandoned objects to determine if the size of the object meets one or more threshold size conditions. For example, is it big enough, or too big, to be an automobile if the objects of interest are vehicles? Is it big enough, or too big, to be a portable piece of luggage if the objects of interest are abandoned packages? If the size threshold(s) is/are met at 122, then at 124 an adjudication matching component checks to see if the object matches a template for one or more objects of interest: for example, does its shape match a vehicle or luggage item template? If not, then at 126 the process/system checks for occlusions that may affect the template determination at 124, for example by repetitively checking for an occlusion affecting the template application over a specified time period frame in order to allow occluding objects to move away from their occluding positions, wherein if the occlusion is removed the template matching at 124 may be reperformed. Lastly, if conditions predicate are met thus far, then at 128 the embodiment requires the object candidate to stay static in the scene for at least a minimum system responsive time (SRT) before being claimed as a true drop or abandoned object of concern, which results in sending an alert at 130. The SRT may be predetermined or set heuristically, and may be any value appropriate to the context of the abandoned object determination depending on user requirements. In some embodiments, cross-correlation based template matching techniques are used at 128 to match the static object to each incoming frame to determine whether or not the object is still at an original location. Otherwise, failing any of the predicate conditions at 120, 122, 126 and 128, an abandoned object candidate may be dropped from tracking in the FSM or otherwise from consideration at 132.

Identifying and modeling TSO's at 102 for tracking by the FSM at 110 is integrated with the background model 103. In some embodiments, three Gaussian distributions are used, for example through a Gaussian Mixture Model (GMM) discussed generally in "Robust and efficient foreground analysis for real-time video surveillance" by Y. Tian, M. Lu, and A. Hampapur, in CVPR, 2005. In this example, the background model 103 is represented by a first distribution and quick changes (i.e. moving foreground objects) are captured with a third distribution. This embodiments differ from prior art GMM approaches in that a second distribution is exclusively reserved for modeling "static" pixels, wherein a pixel is classified as static if the weight of the second distribution of that pixel is greater than a predefined threshold.

More particularly, a static pixel becomes background if its weight continues to grow and exceeds a second higher threshold. To reduce foreground fragments, a "healing" process discussed in the "Robust and efficient foreground analysis for real-time video surveillance" reference by Y. Tian, M. Lu, and A. Hampapur (CVPR, 2005) pushes back foreground regions of high "staticness" to the background at the time when the static region reaches a largest value. "Staticness" refers to an amount or degree that the tracked bounding box data remains static during the tracking by the finite state machine, in other words as to how still the image data is within the bounding box representing the detected object: doe it appear still as an inanimate object should be, or is there some motion found through comparing frame images, as the hands of a sitting person may be observed to move while the rest of the body holds still. In one aspect this degree or amount of staticness may be determined as a ratio of the number of static pixels in a foreground region over the total number of pixels of that region. In some examples, a threshold for a high staticness determination is when the ratio is greater than 0:5, though other values may be practiced. Healing may be achieved by simply swapping the means and variances of the first and second distributions, and then resetting their weights to the maximum and minimum, respectively. With the healing technique, embodiments of the present invention are enhanced with capability to detect static regions which works well in scenes with low activity, though challenges may be presented in handling complex scenes with crowds and high activity.

Figure 3:
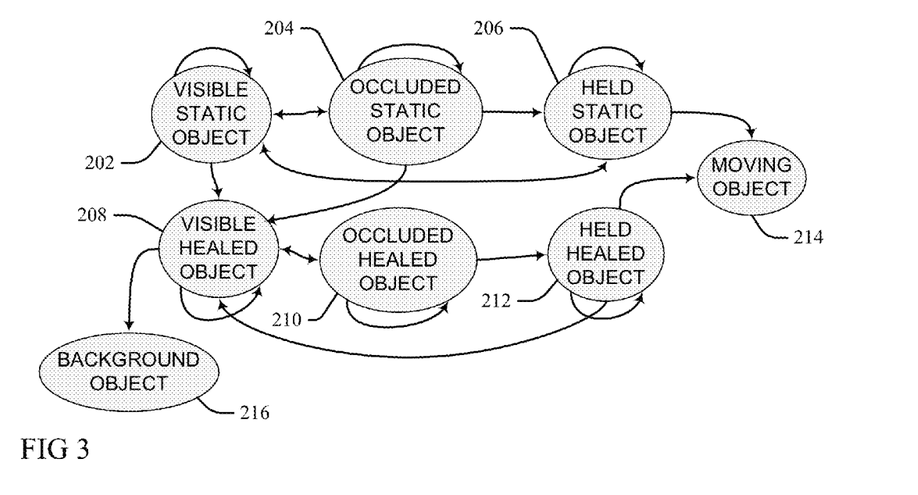
FIG. 3 is a state diagram illustration of state/sub-state classifications of temporally static objects according to the present invention.

FIG. 3 provides a state diagram illustrating six state/sub-state classification combinations over the life cycle of a tracked temporally static object according to embodiments of the present invention: first stage visible static object (VSO) 202, occluded static object (OSO) 204, and held static object (HSO) 206; and second stage visible healed object (VHO) 208, occluded healed object (OHO) 210 and held healed object (HHO) 212. The first stage static object (SO) state refers to an early stage of a temporally static object when the object is in the foreground and its staticness is still being validated. The second stage healed object (HO) state refers to a later, subsequent stage after the object has indicated high staticness, and further may be pushed into the image background as a background object 216. The tracked temporally static objects may also be dropped during the first or second stages through determining that the object is actually a moving object (MO) 214.

Figure 4:
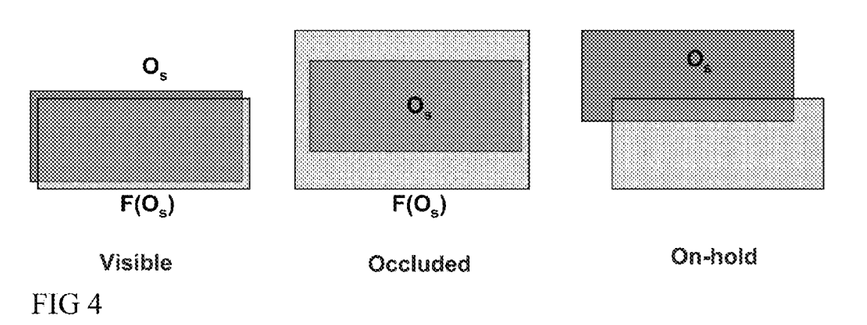
FIG. 4 is a block diagram illustration of bounding box masks positioning in tracking static and foreground objects according to the present invention.

As illustrated in FIG. 4, masks of the bounding boxes of each of the tracked TSO's (denoted as $O_s$) are matched to a foreground mask at 106 for each video data frame of input video, which finds a foreground object (denoted as $F(O_s)$) having a maximum overlap. Note that a foreground object may have multiple static object matches. Accordingly, object occlusions may be determined by the FSM at 110. For example, where $A(x)$ is the mask area of an object x, the six state/sub-states of the TSO's may be classified at 110 through use of the following parameters:

$$r_1 = \mathcal{A}(O_s \cap F(O_s))/\mathcal{A}(O_s)$$

$$r_2 = \mathcal{A}(O_s \cap F(O_s))/\mathcal{A}(O_s \cup F(O_s)) \qquad (1)$$

wherein $r_1$ indicates how much of a tracked object remains in the foreground. The higher the value of $r_1$, the more likely the object stays unmoved. On the other hand, a small $r_1$ implies that the object has moved. The $r_2$ value indicates whether or not the object is occluded. Thus, the classification process at 108 defines the states of the TSO's as a function of these two parameters. More particularly, a temporarily static object $O_s$, if still in the foreground (i.e. static) may be determined to be in a visible sub-state when the following condition is met: iff $r_1 \geq \alpha_0$ and $r_2 \geq \beta_0$, wherein $\alpha_0$ and $\beta_0$ are constant boundary values specified or determined through another process. Similarly, $O_s$ may be determined to be occluded when the following condition is met: iff $r_1 \geq \alpha_0$ and $r_2 < \beta_0$. It is noted that $\alpha_0$ and $\beta_0$ may be set to larger numbers in order to exclude small occlusions from consideration.

Classification at 110 may define a healed object in the background as visible when the following condition is met: iff $1-r_1 \geq \alpha_0$, as in this case there should not be any large foreground region associated with it. Contrarily, a large foreground region overlaid on the object may imply that the object is moving or occluded: accordingly, the classification process may determine that an object is occluded when the following condition is met: iff $1-r_1 <= \alpha_0$ and $e < \gamma_1$, wherein e is a trigger condition ratio of the number of pixels of the TSO matched to the background over the total number of pixels of the TSO used to determine whether the object is moving.

The "held" sub-state is a special state that acts like a buffer zone before terminating tracking of a TSO in the FSM, which in one aspect makes the BGS model more robust to certain issues including camera noise. For example, temporal camera vibrations or movements, or signal noise may result in the determination of different object locations relative to the background from one frame to another, although the object has not in fact moved. By holding the object in the "held" state for a given time period the noisy situation may abate, and subsequent frame matching information confirm that the object is in fact still static and should remain in a static object state for further state/sub-state determinations. Thus, embodiments of the present invention avoid dropping static objects from tracking due to false determinations caused by noise. In some embodiments, a static object may be in the held sub-state for a maximum time ($\delta t$) be determined by an activity of the scene.

Table 1 below provides an example the TSO state transitions illustrated in FIG. 3, and their respective trigger conditions in one embodiment. However, it will be understood that these values and trigger conditions are merely examples, and that other values or trigger conditions may be practiced.

TABLE 1

| state transition | trigger conditions | parameters |
| --- | --- | --- |
| 1: VSO $\Rightarrow$ OSO | $r_1 \geq \alpha_0, r_2 < \beta_0$ | $\alpha_0 = 0.85$ |
| 2: VSO $\Leftarrow$ OSO | $r_1 \geq \alpha_0, r_2 \geq \beta_0$ | $\beta_0 = 0.90$ |
| 3: OSO $\Rightarrow$ HSO | $r_1 < \alpha_0$ | $\gamma_0 = 0.90$ |
| 4: VSO $\Rightarrow$ HSO | $r_1 < \alpha_0$ | $t_1 = 1$ sec |
| 5: VSO $\Leftarrow$ HSO | $r_1 \geq \alpha_0, r_2 \geq \beta_0, \delta t \leq t_1$ | |
| 6: HSO $\Rightarrow$ MO | $r_1 < \alpha_0, \delta t > t_1$ | |
| 7: VSO $\Rightarrow$ VHO | $\rho \geq \gamma_0$ | |
| 8: OSO $\Rightarrow$ OHO | $\rho \geq \gamma_0$ | |
| 9: VHO $\Rightarrow$ OHO | $1 - r_1 < \alpha_1, e < \gamma_1$ | $\alpha_1 = 0.90$ |
| 10: VHO $\Leftarrow$ OHO | $1 - r_1 \geq \alpha_1$ | $\gamma_1 = 0.50$ |
| 11: OHO $\Rightarrow$ HHO | $e \geq \gamma_1$ | $t_2 = 2$ sec |
| 12: HHO $\Rightarrow$ VHO | $1 - r_1 \geq \alpha_1, \delta t < t_2$ | $t_3 = 10$ min |
| 13: VHO $\Rightarrow$ BG | $\delta t \geq t_3$ | |
| 14: HHO $\Rightarrow$ MO | $1 - r_1 < \alpha_1, \delta t \geq t_2$ | |

State transitions 7 and 8 of Table 1 illustrate a temporally static object pushed into the background temporally in healing sub-state process, wherein the staticness $\rho$ of an object is the ratio of the number of static pixels of an object over the total number of pixels of that object; in one aspect a higher $\rho$ leads to longer time to heal an object. In some embodiments the boundary value $\gamma_0$ is set to 0.90, though other values may be practiced or even dynamically determined through another process.

State transitions 6 and 14 of Table 1 illustrate a static object being dismissed from FSM: here the object has moved, so it is terminated by FSM. Transition 11 indicates a healed object about to be dismissed, wherein after the object moves the original background gets exposed again to the camera. If a large portion of pixels is matched to the background (i.e. the mean of the first Gaussian), the object is placed on hold in the FSM waiting for termination, wherein the trigger condition e is again the ratio of the number of pixels of the object matched to the background over the total number of pixels of that object; in some embodiments $\gamma_1$ is set to 0.50, though other values may be practiced.

With respect to the state transition 13, the healed object is dismissed and pushed into background permanently in a process opposite of healing which may termed as "unheal." For example, if an object stays static sufficiently long (for example, a car parked on a street), then there may be no need to keep it in the FSM. In some embodiments, the value of the maximum life span of a static object $t_3$ is set to 10 minutes, though other values may be practiced.

Handling occlusions may pose difficult problems. For example, in the case of a person standing near a bag, even if the bag is completely exposed under the camera view the person may still be connected to the bag in the foreground, due to shadows, morphology operations by a BGS process, or other reasons. Accordingly, the matching process at 106 may not be able to differentiate all objects in such conditions and may misclassify the bag as occluded, unless additional or more sophisticated approaches (such as texture analysis) are implemented. However, such issues do not affect detection of clearly delineated static objects, and transition 8 of Table 1 allows an occluded object to be healed. Furthermore, where a TSO is blocked by more than one object in a multiple-object occlusion, some embodiments of the present invention employ a strategy of "the last wins" to distinguish objects.

By better understanding the status of a static object using the FSM, the embodiments apply adaptive learning and updating of the object locally in the BGS process, which enables more intelligent control of state transitions that is beneficial to both background modeling and abandoned object detection. In one aspect, the information of static objects provided by the finite state machine (FSM) process is leveraged to update background objects at 112 and thereby build and update the background model 103 on an object, region-level analysis. Region-level modeling provides certain benefits over pixel-level modeling. In one aspect, by tracking temporally static objects embodiments of the present invention may update the background in the static regions both more quickly and more carefully, thereby better preventing the background from being contaminated by foreground objects. For example, a person sitting in a chair and holding still may be slowly added to the background in a typical prior art system relying on GMM distribution and mask matching processes as they appear constant from frame to frame, contaminating the background both while they are in the scene, and also afterward (for as much as 30 seconds or a minute or more) until the background is cleaned-up after they leave the scene (get up and board a train, etc.). This is due to the fact that prior art GMM updating of the background is generally a global, pixel-by-pixel process, and updating speed is dependent on the learning rate of the global process.

In contrast, by holding tracked objects in the held sub-states rather than quickly adding them to the background, embodiments of the present invention both avoid needlessly contaminating the background and reduce foreground fragments caused by static objects, and enable faster learning rates for updating the backgrounds, as the local area of the object need only be updated (rather than a global pixel-by-pixel update). Though a healed object may be pushed into the background, embodiments of the present invention still track the object in the FSM and thus it may be quickly recovered and placed back in the foreground domain when subsequent movement of the object indicates that it is in fact not a static object.

Embodiments may update the background by applying different learning rates to held object regions, or even disables any update of a first Gaussian distribution of said regions to preserve the original background. In some embodiments, region-level modeling using GMM includes updating each of the Gaussian distributions (mean $\mu$ and variance $\sigma$) and its weight w for each pixel through following equations taught by "Adaptive background mixture models for real-time tracking" by C. Stauffer and W. E. L. Grimson, CVPR 1999, pages II: 246-252:

$$\mu_t = (1-\rho)\mu_{t-1} + \rho X_t \qquad (2)$$

$$\sigma_t^2 = (1-\rho)\sigma_{t-1}^2 + \rho(X_t-\mu_t)^T(X_t-\mu_t) \qquad (3)$$

$$\omega_{k,t} = (1-\alpha)\omega_{k,t-1} + \alpha(M_{k,t}) \qquad (4)$$

where $X_t$ is the pixel intensity and $M_{k,t}$ is a binary number which is one for the matched distribution and zero for the others. For a background pixel or a regular pixel of a moving object, the process follows the same updating process as described above, and further by setting constant learning rates for $\rho$ and $\alpha$, for example setting $\rho=\rho_0$ and $\alpha=\alpha_0$.

However, for a pixel of a temporally static object $O_s$ still in the foreground (i.e. before healed), updating at 110 in such embodiments disables any update of the first Gaussian distribution to preserve the original background, and focuses on updating the second distribution related to static objects. Specifically, the model learning rate $\alpha$ and the weight learning rate $\beta$ are made adaptively adjustable depending on the object status according to:

$$\alpha = \frac{2.0}{1.0 + e^{(\tau - 0.05) * 100}} \alpha_0; \; \beta = \frac{2.0}{1.0 + e^{(\tau - 0.05) * 100}} \beta_0 \quad (5)$$

where τ is defined as follows:

$$\tau = \frac{A(O_s \cup F(O_s) - O_s \cap F(O_s))}{A(O_s)} \quad (6)$$

Here τ indicates how well a static object is matched to its corresponding foreground object. A mismatch due to internal motion such as the movement of a person will decrease the learning rates significantly, while an abandoned object, when not occluded, usually will align to a foreground object well, thus gaining a faster learning rate, for example up to two times of the default constant based on (5).

When an object $O_s$ is occluded, a slow update may be applied to it based on (4) using the learning rates computed from (5). However, when $O_s$ is visible, a more aggressive update may be performed, for example:

$$w_{2,t} = \begin{cases} (1-\alpha)w_{2,t-1} + \alpha & M_{2,t} = 1 \\ 0.5 * w_{2,t-1} & \text{Otherwise} \end{cases} \quad (7)$$

The process of (7) changes the weight of a pixel more dramatically than the process of (5) if the pixel doesn't agree on the second distribution (for example, α<<0:5 in the case of occlusion). In one aspect, this may prevent "near static" objects (for example, still persons) from being adapted into the background as, strictly speaking, they are not static objects. On the other hand, a true drop, even if occluded, will now be less affected by the foreground due to the slow learning rates. Further, for a pixel of a healed object embodiment updates the background (i.e. the first distribution) in a regular way with constant learning rates, but wherein the second distribution remains unchanged and stores the original background after healing.

Thus, embodiments of the present invention provide robust approaches for abandoned object detection based on proactive scheme to model temporally static objects. By using a finite state machine embodiments may track the entire life cycle of TSOs from creation to termination. The state transition of a tracked object may be performed by efficient analysis of how well the object is matched to foreground map at each video frame. Semantically meaningful information about static objects from the FSM may in turn be fed back to the BGS model, enabling effective region-level adaptive background modeling. This two-way, feedback interaction mechanism not only leads to a reduction of pedestrian-related false alarms relative to prior art approaches, but also offers a natural way to handle occlusion problems proven to be a difficult generally in AOD.

It will be understood that while adaptive background modeling has been herein discussed with respect to exploiting high-level information of static objects, embodiments of the present invention are not limited to implementations for detecting static objects. Embodiments may improve background modeling in a variety of complex scene applications, enhances many video surveillance applications (for example, tracking applications) that are based on background subtraction. Moreover, although some prior art processes use region properties or semantics of foreground objects in background modeling, such previous approaches require either explicit sophisticated object recognition, or labeling or other classification or objects, or use both in dual models. Embodiments of the present invention provide a simpler and more efficient approach, one more suitable for large-scale video surveillance, for example with respect to dense and high traffic urban areas, without requiring object labeling or other complex property determinations.

Figure 5:
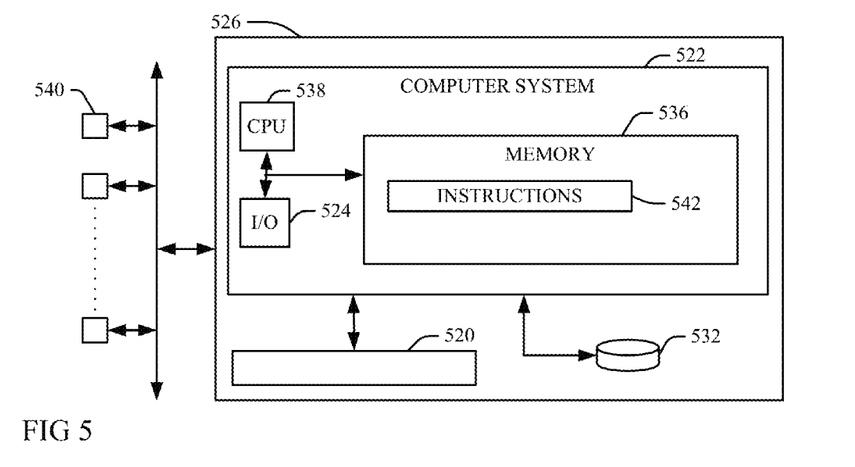
FIG. 5 is a block diagram illustration of a computerized implementation of an embodiment of the present invention.

Referring now to FIG. 5, an exemplary computerized implementation of an embodiment of the present invention includes a computer or other programmable device 522 in communication with one or more cameras or other imaging devices 540 (for example, video cameras or video servers, etc.). Instructions 542 reside within computer readable code in a computer readable memory 536, or in a computer readable storage system 532, another device 540 or other computer readable storage medium that is accessed through a computer network infrastructure 526 by a processing unit (CPU) 538. Thus, the instructions, when implemented by the processing unit (CPU) 538, cause the processing unit (CPU) 538 to use an adaptive background modeling and subtraction model to generate classify objects as described above with respect to FIGS. 1 through 4.

Figure 6:
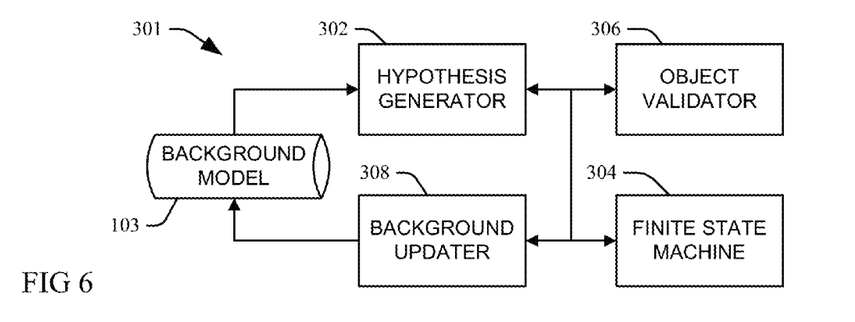
FIG. 6 is a block diagram illustration of an article according to the present invention that uses adaptive background modeling to track objects.

FIG. 6 illustrates an embodiment of an article 301 (for example, a programmable device, system, etc.) according to the present invention. One or more of the components of the article 301 are tangible devices that perform specific functions, for example comprising a processing unit, a computer readable memory and a tangible computer readable storage medium. More particularly, a Hypothesis Generator 302 detects foreground object blobs distinguished from a BGS model scene image background that have bounding boxes detected in image data, and classifies those that stay static (remain unchanged) in the scene image for at least a static threshold period as temporally static objects (TSO). The TSO's are tracked by a Finite State Machine (FSM) 304, which matches masks of the temporally static objects with foreground objects in the BGS model and classifies the temporally static objects as a function of the matching results as one of the six state/sub-states classes, and thereby outputs "visible healed objects" as possible (hypothetic) abandoned objects to an Abandoned Object Validator 306. The FSM 304 output is also used as feedback by a Background Updater 308 to update the adaptive background used by the Hypothesis Generator 302 to detect the foreground object blobs, for example by drops TSO's classified as moving objects, pushing TSO's into the background, etc. As discussed above with respect to FIG. 2, the Abandoned Object Validator 306 performs foregroundness validation to eliminate ghosts, applies size templates, checks occlusions and applies minimum system response time requirements in order to drop candidates or issue alerts with respect to each healed-static candidate reported out by the FSM 304.

Embodiments of the present invention may also perform process steps of the invention on a subscription, advertising, and/or fee basis. That is, a service provider could offer to use an adaptive background modeling and subtraction model to generate classify objects, systems or articles as described above with respect to FIGS. 1-6. Thus, the service provider can create, maintain, and support, etc., a computer infrastructure such as the network computer system 522, network environment 526, or parts thereof, or the article 301, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/301, from a computer-readable medium device 536, 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for using region-level adaptive background modeling, the method comprising:
    classifying via a finite state machine device an object blob having a bounding box detected in frame image data of a video data input as a background object, as a moving foreground object, or as a temporally static object, by classifying the object blob as the temporally static object when the detected bounding box is distinguished from a background model of a scene image of the video data input and remains static in the scene image for at least a first threshold period;
    tracking the bounding box of the object blob classified as the temporally static object via the finite state machine device by matching masks of the bounding box in subsequent frame data of the video data input; and
    sub-classifying the tracked temporally static object as within a visible sub-state, as within an occluded sub-state, or as within another sub-state that is not visible and not occluded, as a function of a static value ratio of a total number of pixels overlapped by both the tracked bounding box and a foreground region of the background model over a total number of pixels contained within the tracked bounding box, wherein the foreground region corresponds to the tracked bounding box.

2. The method of claim 1, wherein the step of classifying the object blob further comprises classifying the object as a type of background, foreground or static object, the method further comprising:
    updating a background region of the background model at a regular rate while suppressing an update in the foreground region to preserve the background model foreground region as a function of the classifying the object as the type of background, foreground or static object.

3. The method of claim 2, wherein the step of sub-classifying the tracked temporally static object further comprises sub-classifying the tracked temporally static object within one of visible-static, occluded-static, held-static, visible-healed, occluded-healed, and held-healed sub-states; and
    the method further comprising adjusting the background updating locally as a function of the status of the object as the one of the visible-static, occluded-static, held-static, visible-healed, occluded-healed, and held-healed sub-states.

4. The method of claim 3, further comprising:
    determining the learning rate of the tracked temporally static object by how well the object is matched to a corresponding foreground mask; and
    performing a faster update if the tracked temporally static object has a static-visible sub-state and a slower update if the object has an occluded sub-state.

5. The method of claim 4, further comprising:
    identifying the tracked temporally static object in the visible-healed sub-state as a hypothetic abandoned object candidate if the static value ratio remains above a value indicative of the visible-healed sub-state for threshold period.

6. The method of claim 5, wherein the background model is a Gaussian mixture model, the method further comprising:
    re-classifying the tracked static object in the visible-static sub-state into the visible-healed sub-state as a function of swapping means and variances of first and second Gaussian distributions of the Gaussian mixture model and then resetting weights of the swapped means and variances to respective maximums and minimums.

7. A method of providing a service for using region-level adaptive background modeling, the method comprising providing:
    a finite state machine that:
        classifies an object blob having a bounding box detected in frame image data of a video data input as a background object, as a moving foreground object, or as a temporally static object, by classifying the object blob as the temporally static object when the detected bounding box is distinguished from a background model of a scene image of the video data input and remains static in the scene image for at least a first threshold period;
        tracks the bounding box of the object blob classified as the temporally static object by matching masks of the bounding box in subsequent frame data of the video data input; and
        sub-classifies the tracked temporally static object as within a visible sub-state, as within an occluded sub-state, or as within another sub-state that is not visible and not occluded, as a function of a static value ratio of a total number of pixels overlapped by both the tracked bounding box and a foreground region of the background model over a total number of pixels contained within the tracked bounding box, wherein the foreground region corresponds to the tracked bounding box.

8. The method of claim 7, further comprising:
providing a background updater that updates a background region of the background model at a regular rate while suppressing an update in the foreground region to preserve the background model foreground region as a function of the classification of the object by the finite state machine as the type of background, foreground or static object.

9. The method of claim 8, further comprising:
providing an abandoned object validator that performs foreground validation to eliminate spurious objects, applies size templates, checks occlusions or applies minimum system response time requirements in order to drop a candidate or issue an alert with respect to each of one or more hypothetic abandoned objects reported by the finite state machine.

10. The method of claim 9, wherein the finite state machine sub-classifies the tracked temporally static object as one of visible-static, occluded-static, held-static, visible-healed, occluded-healed, and held-healed sub-states; and
wherein the background updater adjusts locally as a function of the status of the object as the one of the visible-static, occluded-static, held-static, visible-healed, occluded-healed, and held-healed sub-states.

11. The method of claim 10, wherein the background model is a Gaussian mixture model;
wherein the finite state machine classifies pixels of the tracked temporally static objects as static pixels if a weight of a second Gaussian distribution of the pixels is greater than a first predefined threshold ratio of a number of static pixels in a foreground region over a total number of pixels of that foreground region, models the static pixels by a second Gaussian distribution, and captures changes in a foreground of the video data scene image with a third Gaussian distribution; and
wherein the background updater pushes the static pixels of a temporally static object into the background modeled if their weights grow and exceed a second threshold ratio that is higher than the first predefined threshold ratio, and wherein the weights of the static pixels are defined as ratios of the number of static pixels in a foreground region over the total number of pixels of the foreground region.

12. The method of claim 11, wherein the background updater further:
determines the learning rate of the tracked temporally static object by how well the object is matched to a corresponding foreground mask; and
performs a faster update if the tracked temporally static object has a static-visible sub-state and a slower update if the object has an occluded sub-state.

13. The method of claim 12, the finite state machine re-classifies the tracked static object in the visible-static sub-state into the visible-healed sub-state as a function of swapping means and variances of first and second Gaussian distributions of the Gaussian mixture model and then resetting weights of the swapped means and variances to respective maximums and minimums.

14. A system, comprising:
a processing unit;
a computer readable memory; and
a computer-readable storage medium;
wherein the processing unit, when executing program instructions stored on the computer-readable storage medium via the computer readable memory:
classifies an object blob having a bounding box detected in frame image data of a video data input as a background object, as a moving foreground object, or as a temporally static object, by classifying the object blob as the temporally static object when the detected bounding box is distinguished from a background model of a scene image of the video data input and remains static in the scene image for at least a first threshold period;
tracks the bounding box of the object blob classified as the temporally static object by matching masks of the bounding box in subsequent frame data of the video data input; and
sub-classifies the tracked temporally static object as within a visible sub-state, as within an occluded sub-state, or as within another sub-state that is not visible and not occluded, as a function of a static value ratio of a total number of pixels overlapped by both the tracked bounding box and a foreground region of the background model over a total number of pixels contained within the tracked bounding box, wherein the foreground region corresponds to the tracked bounding box.

15. The system of claim 14, wherein the processing unit, when executing the program instructions stored on the computer-readable storage medium via the computer readable memory, further classifies the object as a type of background, foreground or static object; and
updates a background region of the background model at a regular rate while suppressing an update in the foreground region to preserve the background model foreground region as a function of the classifying the object as the type of background, foreground or static object.

16. The system of claim 15, wherein the processing unit, when executing the program instructions stored on the computer-readable storage medium via the computer readable memory, further sub-classifies the tracked temporally static object within one of visible-static, occluded-static, held-static, visible-healed, occluded-healed, and held-healed sub-states; and
adjusts the background updating locally as a function of the status of the object as the one of the visible-static, occluded-static, held-static, visible-healed, occluded-healed, and held-healed sub-states.

17. The system of claim 16, wherein the processing unit, when executing the program instructions stored on the computer-readable storage medium via the computer readable memory, further:
determines the learning rate of the tracked temporally static object by how well the object is matched to a corresponding foreground mask; and
performs a faster update if the tracked temporally static object has a static-visible sub-state and a slower update if the object has an occluded sub-state.

18. An article of manufacture, comprising:
a computer readable storage medium having computer readable program code embodied therewith, the computer readable program code comprising instructions that, when executed by a computer processor, cause the computer processor to:
classify an object blob having a bounding box detected in frame image data of a video data input as a background object, as a moving foreground object, or as a temporally static object, by classifying the object blob as the temporally static object when the detected bounding box is distinguished from a background model of a scene image of the video data input and remains static in the scene image for at least a first threshold period;

track the bounding box of the object blob classified as the temporally static object by matching masks of the bounding box in subsequent frame data of the video data input; and sub-classify the tracked temporally static object as within a visible sub-state, as within an occluded sub-state, or as within another sub-state that is not visible and not occluded, as a function of a static value ratio of a total number of pixels overlapped by both the tracked bounding box and a foreground region of the background model over a total number of pixels contained within the tracked bounding box, wherein the foreground region corresponds to the tracked bounding box.

19. The article of manufacture of claim 18, wherein the computer readable program code instructions, when executed by the computer processor, further cause the computer processor to:

classify the object as a type of background, foreground or static object; and update a background region of the background model at a regular rate while suppressing an update in the foreground region to preserve the background model foreground region as a function of the classifying the object as the type of background, foreground or static object.

20. The article of manufacture of claim 19, wherein the computer readable program code instructions, when executed by the computer processor, further cause the computer processor to:

sub-classify the tracked temporally static object within one of visible-static, occluded-static, held-static, visible-healed, occluded-healed, and held-healed sub-states; and adjust the background updating locally as a function of the status of the object as the one of the visible-static, occluded-static, held-static, visible-healed, occluded-healed, and held-healed sub-states.

* * * * *